United States Patent [19]

Osterloh et al.

[11] Patent Number: 4,713,440

[45] Date of Patent: * Dec. 15, 1987

[54] UREA/POLYAMINE/SECONDARY MONOAMINE/POLYALCOHOL CONDENSATE

[75] Inventors: Rolf Osterloh, Gruenstadt; Eberhard Schupp, Schwetzingen; Werner Loch, Eropolzheim; Klaas Ahlers, Muenster, all of Fed. Rep. of Germany

[73] Assignee: BASF Aktiengesellschaft, Ludwigshafen, Fed. Rep. of Germany

[*] Notice: The portion of the term of this patent subsequent to Feb. 4, 2003 has been disclaimed.

[21] Appl. No.: 776,378

[22] Filed: Sep. 16, 1985

[30] Foreign Application Priority Data

Sep. 19, 1984 [DE] Fed. Rep. of Germany ....... 3434318

[51] Int. Cl.$^4$ ............................................. C08G 71/02
[52] U.S. Cl. ..................................... 528/367; 525/55; 525/381; 525/382; 525/403; 525/437; 525/467; 525/490; 525/523; 525/540; 528/368
[58] Field of Search ................... 528/367, 368; 525/55, 525/381, 382, 403, 437, 467, 490, 523, 540

[56] References Cited

U.S. PATENT DOCUMENTS 2,653,144  9/1953  Wielicki ............................. 260/77.5
4,568,729  2/1986  Schupp et al. ...................... 528/367

FOREIGN PATENT DOCUMENTS 1569391  11/1980  United Kingdom .

Primary Examiner—Harold D. Anderson
Attorney, Agent, or Firm—Keil & Weinkauf

[57] ABSTRACT

A processor for the preparation of urea condensates and the preparation of heat-curable surface coatings.

To prepare these urea condensates, primary di- and/or polyamine is reacted with urea, a secondary monoamine and a polyalcohol which contains certain groups at elevated temperatures and in the presence or absence of a catalyst, and the ammonia formed is separated off.

These urea condensates are suitable as binder components in heat-curable surface coatings, in particular for heat-curable cathodic electrocoating finishes.

18 Claims, No Drawings

UREA/POLYAMINE/SECONDARY MONOAMINE/POLYALCOHOL CONDENSATE

The present invention relates to a process for the preparation of urea condensates from primary polyamines, urea, secondary amines and polyalcohols which contain two or more primary or secondary hydroxyl groups, some or all of which contain further groups, and the preparation of heat-curable surface coatings.

The preparation of urea copolymers from diamines and urea have been disclosed (cf. R. Pasedag, Meeting of the GDCh Macromolecular Chemistry Group in Bad Nauheim 1966). Although the products obtained could be used for injection molding and blowmolding methods, their poor solubility made them unsuitable for surface coatings.

German Patent Application No. P 33 11 514.1 proposes a process for the preparation of urea condensates which can be used in binders for heat-curable surface coatings. However, this process proved difficult to carry out in that substantial amounts of ammonia had to be distilled off in a short time at the beginning of the condensation. Furthermore, the resulting condensates were not completely satisfactory in respect of their coating properties, such as flow and control of film thickness, when they were used as binder components in aqueous or water-dilutable surface coatings.

It is an object of the present invention to provide a process for the preparation of urea condensates which give improved heat-curable surface coatings when used as components for coating binders.

We have found, surprisingly, that this object is achieved by the concomitant use of special polyols in the urea condensation.

The present invention relates to a process for the preparation of urea condensates, wherein (A) one or more primary di- and/or polyamines are reacted with
(B) urea,
(C) one or more secondary monoamines and
(D) one or more polyalcohols which contain two or more primary or secondary hydroxyl groups and in addition one or more of the groups —O—, —S—,

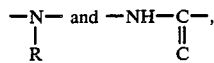

where R is alkyl of 1 to 12 carbon atoms, cycloalkyl, unsubstituted or substituted phenyl of 6 to 20 carbon atoms, hydroxyalkyl of 2 to 12 carbon atoms or a hydroxyalkyl radical as obtained by an addition reaction of an epoxide compound with a secondary amine, and (D) may be partially replaced with (E) one or more polyalcohols which differ from (D) and contain two or more primary or secondary hydroxyl groups, at elevated temperatures and in the presence or absence of a catalyst, and the ammonia formed is separated off.

The present invention furthermore relates to urea condensates obtainable by the process according to the invention.

The invention furthermore relates to processes for the preparation of heat-curable surface coatings, for powder coating and in particular for the preparation of cathodic electrocoating finishes, the urea condensates prepared according to the invention being used.

Using the process according to the invention, it is possible to prepare, in a simple manner, urea condensates which can be very advantageously used as binder components in heat-curable surface coatings. When added to self-crosslinking binders, the urea condensates according to the invention make the film very hard and flexible, in the case of non-self-crosslinking binders, the urea condensates according to the invention may furthermore assume the function of a highly effective crosslinking agent, giving hard, crosslinked films above about 130° C.

Regarding the components to be used for the preparation process according to the invention, the following may be stated specifically:

(A) Suitable primary di- and/or polyamine (A) are in principle all aliphatic, cycloaliphatic and aromatic polyamines which contain two or more primary amino groups. Non-cyclic aliphatic amines having less than 4 carbon atoms between the primary amino groups and cycloaliphatic or aromatic amines whose primary amino groups are separated from one another by fewer than 3 carbon atoms are less preferable since these amines combine with ureas to form cyclic ureas. The primary di- and/or polyamines may contain, in addition to the primary amino groups, further functional groups, such as secondary or tertiary amino groups, hydroxyl groups or ether groups. Examples of suitable amines are 1,4-diaminobutane, 1,6-diaminohexane, heptamethylenediamine, octamethylenediamine, nonamethylenediamine, decamethylenediamine, dodecamethylenediamine and branched aliphatic primary diamines, eg. the isomer mixture of 9- and 10-aminostearylamine and of 9- and 10-aminoethylstearylamine, 4,9-dioxadodecane-1,12-diamine, 2-methyl- pentane-1,5-diamine, 4,4'-diaminodicyclohexylmethane, 3,3'-dimethyl-4,4'-diaminodicyclohexylmethane, 4,4'-diaminodiphenylmethane, toluylenediamine, tris(aminoethyl)amine and tris(aminopropoxyethyl)amine.

In addition to polyamines of this type, having a low, defined molecular weight, oligomeric or polymeric polyamines having molecular weights as high as 3000 may also be used as component (A). Examples of such polyamines are diamines which can be prepared by reductive cyanoethylation of polyols, such as polytetrahydrofuran. Products of this type contain terminal primary amino groups in the form of aminopropoxy groups.

The amines described above can be used alone or as a mixture with one another.

(B) Component (B) is urea.

(C) In principle, any secondary amines can be used as secondary amines (C). Those having a boiling point of less than 250°C. are preferred, and those having a boiling point of from 100 to 200°C. are particularly preferred. Examples of particularly preferred amines are di-n-propylamine, diisopropylamine, di-n-butylamine, di-sec.-butylamine, diisobutylamine and di-n-hexylamine.

(D) Suitable polyalcohols (D), which contain two or v 5 more priary or secondary hydroxyl groups, are those which additionally contain one or more of the groups —O—, —S—,

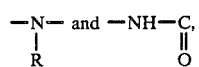

where R is alkyl of 1 to 12 carbon atoms, cycloalkyl, unsubstituted or substituted phenyl of 6 to 20 carbon atoms, hydroxyalkyl of 2 to 12 carbon atoms or a hydroxyalkyl radical as obtained by an addition reaction of an epoxide compound with a secondary amine.

Examples of suitable polyalcohols (D) which contain ether groups —O— are compounds of the type $R^1$—O—$R^2$ and $R^1$—(O—$CH_2$—$CH_2$)$_n$—O—$R^2$, where $R^1$ and $R^2$ are identical or different and are each hydroxyalkyl of 2 to 14 carbon atoms, and n is from 1 to 20. Examples of suitable compounds of this type are diglycol, triglycol, oxyethylation products of polyhydric alcohols, such as oxyethylation products of trimethylolpropane, pentaerythritol, sucrose or trishydroxyethyl isocyanurate or of diols such as neopentylglycol, hexanediol, butanediol or polytetrahydrofuran (molecular weight range from 400 to 2000) and oxyethylation products of diphenols.

Examples of suitable polyalcohols (D) which contain thioether groups —S— are compounds of the type $R^1$—S—$R^2$ and $R^1$—S—($CH_2$—$CH_2$—O )$_n$—$R^2$, where R1 and and R2 are identical or different and are each hydroxyalkyl of 2 to 14 carbon atoms and n is from 1 to 5. An example of a suitable compound of this type is thiodiglycol.

Examples of suitable polyalcohols (D) which contain tertiary amino groups

are compounds of the type

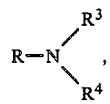

where $R^3$ and $R^4$ are identical or different and are each hydroxyalkyl of 2 to 20 carbon atoms and R is alkyl of 1 to 12 carbon atoms, hydroxyalkyl of 2 to 12 carbon atoms, cycloalkyl of 6 to 20, preferably 6 to 17, carbon atoms, phenyl, substituted, preferably alkyl-substituted, phenyl of 7 to 20, preferably 7 to 17, carbon atoms, or a hydroxyalkyl radical as obtained by an addition reaction of an epoxide compound with a secondary amine, in particular a secondary dialkanolamine, or by an addition reaction of a polyfunctional epoxide compound with a secondary monoalkanolamine.

Examples of suitable compounds (D) possessing tertiary amino groups are oxyalkylation products of primary monoamines, eg. methyldiethanolamine, methyldipropanolamine, isobutyldiethanolamine, stearyldiethanolamine, cyclohexyldiethanolamine, phenyldiethanolamine, benzyldiethanolamine or 2-methoxydiethanolamine and 3ethoxypropyldiethanolamine, oxyalkylation products of ammonia, eg. triethanolamine or tripropanolamine, and their reaction products with ethylene oxide or glycidol; other suitable compounds are alkylolation products of diamines, eg. of ethylenediamine, propylenediamine, neopentyldiamine, hexamethylenediamine, 4,9-dioxadodecane 1,12-diamine, bis(3-aminopropyl)polytetrahydrofuran (molecular weight about 750) and other diamines listed above under (A); further uitable compounds are oxyalkylation products of primary/secondary, primary/tertiary or disecondary amines, eg. 3-amino-1-methylaminopropane, 2-diethylaminoethylamine, dimethylaminopropylamine, diethylenetriamine and piperazine; other suitable components (D) are reaction products of alkanolamines, eg. diethanolamine, methylethanolamine or dipropanolamine, with aliphatic or cycloaliphatic diepoxides or diepoxides derived from diphenols, eg. butanediol diglycidyl ether, bisphenol A diglycidyl ether or homologous diglycidyl ethers derived from these; reaction products of the abovementioned alkanolamines with glycidol are also suitable as component (D).

Examples of suitable polyalcohols (D) which contain carboxamide groups

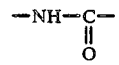

are compounds of the type where $R^5$ is hydroxyalkyl of 2 to 6 carbon atoms and R6 is a divalent radical, in particular alkylene of 3 to 36, preferably 4 to 12, carbon atoms. Examples of such compounds are reaction products of dicarboxylic acids of 3 to 36 carbon atoms, eg. dimethylmalonic acid, malonic acid, adipic acid or a dimeric fatty acid, with ethanolamine or propanolamine.

Preferred polyalcohols (D) are those which have a molecular weight of from 106 to 5000 and contain from 2 to 10 hydroxyl groups.

Some of component (D), about 10 - 50% by weight, can, if required, be replaced with one or more polyalcohols (E) which do not contain any —O—, —S—,

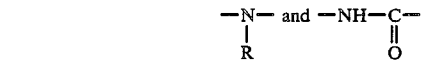

groups.

Polyalcohols (E) contain two or more primary or secondary hydroxyl groups. Examples of polyalcohols (E) are ethylene glycol, propylene 1,3-glycol, butanediol, neopentylglycol, hexanediol and neopentylglycol hydroxy- pivalate.

Polyalcohols (E) possessing more than 2 hydroxyl groups can be used for increasing the functionality of the urea condensates according to the invention. The presence of some polyols in the preparation of binder components according to the invention which are used for cathodic electrocoating may even lead to better stress resistance and better throwing power of the electrocoating finishes. Examples of useful polyalcohols of this type are trimethylolpropane, trishydroxyethyl isocyanurate and pentaerythritol.

For the novel preparation of the urea condensates, components (A), (B), (C), (D) and, where relevant, (E) are reacted with one another at elevated temperatures, for example by heating them gradually to 140°-230° C., preferably 150-210.

It is not necessary to introduce all the components (A) to (D) or (A) to (E) simultaneously; for example, it is also possible first to react the urea (B) and the primary di- and/or polyamine (A) at from 110 to 150o#C, and then to add the secondary amine (C) either all at once or gradually at a rate corresponding to the rate of conversion, the temperature advantageously being maintained at from 140 to 230o#C. Gradual addition is possible in cases where a secondary amine having a relatively low boiling point is used and the process is not carried out under superatmospheric pressure. When the addition is complete, the mixture is allowed to continue reaction in general for a further 1-20 hours.

The polyalcohols (D) and, where relevant, (E) can be added together with the amines to the urea, but it is also possible first to react only components (A) to (C) and then to react the product with the polyalcohols (D) and, where relevant,(E).

However, the reaction can be controlled in a particularly advantageous manner if only the components (B), (C) and, where relevant, (E) are initially taken and heated 180#C, and only then component (A) is metered in over a period of up to 5, preferably from 0.1 to 3, hours (depending on the size of the batch). When the addition of component (A) is complete, component (D) can be added in a further step. The reaction and the addition of the components (A) and (D) can be carried out under superatmospheric pressure, eg. from 0.1 to 20 bar.

It is in general not necessary to use a catalyst in the reaction, although it is also possible to employ catalysts, such as basic catalysts, eg. sodium methylate, or acidic catalysts, such as p-toluenesulfonic acid or B-naphthalenesulfonic acid, heavy metal salts, preferably Cu(I) salts, such as copper(I) chloride or Cu(I) bromide, or tin salts, preferably those containing organic radicals, eg. dibutyltin dilaurate, in amounts of up to 3% by weight, based on the total amount of components (A) to (D) or (A) to (E).

The proportions in which the individual components (A) to (E) are used are not critical. In general, the ratio of the number of equivalents of $NH_2$ groups of the primary di- and/or polyamines (A) to the number of equivalents of NHz group of the urea (B) to the number of equivalents of $NH_2$ groups of the secondary monoamine (C) to the number of equivalents of OH groups of the polyalcohol (D) or (D+E) is 1:1.2–2.4:0.2–20:0.1–0.9:0–0.5, or about 2 equivalents of the sum of (A), (C) and (D) or (D+E) are used per mole of urea (B). In order to accelerate the reaction, it is also possible to employ an excess of (C), which is removed again at the end of the reaction.

The preparation of the urea condensates can be carried out in an inert solvent, such as a fairly highboiling hydrocarbon or ether. Examples of suitable solvents are toluene, xylene and hydrocarbon fractions boiling within a range from 120 to 220° and an example of an ether is 5,8-dioxadodecane. However, the reaction may also be carried out in the absence of a solvent.

The urea condensates prepared according to the invention are outstandingly suitable as binder components in heat-curable surface coatings. When they are added to self-crosslinking binders, they impart greater hardness and flexibility to the baked surface coating films and improve adhesion to metal and corrosion protection; in the case of non-self-crosslinking binders, the urea condensates according to the invention can furthermore assume the function of a highly effective crosslinking agent, leading to hard, crosslinked films above about 130#C.@

Suitable self-crosslinking binders or non-selfcrosslinking binders, which can be combined with the urea condensates according to the invention, are the binders usually employed in surface coating chemistry. Polyadducts, polycondensates or polymers having a mean molecular weight e,ovs/$M/_n$ of from 500 to 10,000, which may be selected from a very large variety of classes of compounds, are particularly uitable. The only important factor is that they posses on average two or more OH groups and/or primary and/or econdary amino groups. Preferably, the components should have a resin-like character. Examples of uitable material are polyesters, alkyd resins, polyethers, polyacrylate resins, polyurethanes, epoxy resins and their reaction products with alcohols, mercaptans or amines. Another suitable class of compounds comprises polydiene resins or polydiene oils, eg. polybutadiene oils. OH groups can be introduced into these by, for example, an addition reaction between mercaptoethanol and some of the double bonds. Another possible method of introducing OH groups is by reaction with maleic anhydride followed by reaction with OH-containing amines, such as ethanolamine or diethanolamine. The required derivatization may also be effected by epoxidation of the polybutadiene oils with peracids, followed by reaction with amines.

Suitable polyesters are those which have a mean molecular weight $\overline{MHD}$ n of from 500 to 10,000 and a hydroxyl number of from 25 to 400 and are obtained from aliphatic and/or aromatic dicarboxylic acids of 4 to 10 carbon atoms, eg. succinic aid, glutaric acid, adipic acid, pimelic acid, suberic acid, azelaic acid, sebacic acid, cyclohexanedicarboxylic acid, phthalic acid, isophthalic acid or terephthalic acid or their derivatives, and polyhydric alcohols, such as aliphatic diols, eg. ethylene glycol, diethylene glycol, triethylene glycol, polyethylene glycol, propanediol, butanediol, hexanediol, neopentylglycol or neopentylglycol hydroxypivalate and, if appropriate, alcohols containing more than two alcoholic OH groups, such as trimethylolpropane, glycerol, erythritol, pentaerythritol, trimethylolbenzene or trishydroxyethyl iso- cyanurate.

Suitable alkyd resins have a similar composition but additionally contain one or more monocarboxylic acids, eg. fatty acids. Alkyd resins which contain glycidyl esters of branched carboxylic acids may also be used.

Examples of suitable polyethers are aliphatic or araLiphatic polyethers which are obtained by reacting dihydric and/or polyhydric alcohols with various amounts of ethylene oxide and/or propylene oxide.

Suitable polyacrylates are OH-containing polyacrylates which have a hydroxyl number of from 25 to 500, an acid number of <25, preferably <10, and a Fikentscher K value (3% strength in acetone) of from 10 to 40, preferably from 12 to 25, and may contain, for example, the following monomer as copolymerized units:

From 10 to 100, preferably from 20 to 40, % by weight of one or more OH-containing or NH-containing monomers, for example isopropylaminopropyl methacrylamide, or hydroxy-($C_2$–$C_4$)-alkyl esters of an α, β-ethylenically unsaturated carboxylic acid, for example 2-hydroxyethyl and hydroxypropyl (meth)acrylate and butanediol mono(meth)acrylate, and from 0 to 90, preferably from 60 to 80 % by weight of one or more ethylenically unsaturated carboxyl-free and hydroxyl-free compounds, for example vinylaromatics, such as styrene and vinyltoluene, vinyl esters of carboxylic acids of 2 to 18 carbon atoms, such as vinyl acetate and vinyl propionate, vinyl ethers of monoalkanols of 1 to 18 carbon atoms, such as vinyl methyl ether and vinyl isobutyl ether, esters of acrylic acid or methacrylic acid with C1-C12-monoalkanols, the corresponding maleic, fumaric and itaconic diesters, (meth)acrylamide, (meth)acrylonitrile, monomers containing tertiary amino groups, such as diethylaminoethyl acrylate or diethylaminoethylacrylamide and mixtures of these monomers. Another possible way of obtaining basic acrylates is to use epoxidecarrying monomers, such as glycidyl methacrylate, and to subject the oxirane rings of the polymers to an addition reaction with amines.

Suitable polyurethanes are:

OH-containing polyurethanes which have a hydroxyl number of from 25 to 600 and are prepared from aliphatic and/or aromatic diisocyanates, which were obtainable from, for example, tetramethylene diisocyanate, hexamethylene diisocyanate, isophorone diisocyanate, diphenylmethane diisocyanate, toluylene diisocyanate, naphthylene diisocyanate, 4,4'-diphenyl ether diisocyanate and any dimers or trimers derived from these, and aliphatic diols, such as ethylene glycol, diethylene glycol, triethylene glycol, polyethylene glycols, propanediol, butanediol, hexanediol, neopentylglycol or neopentylglycol hydroxypivalate, and, if appropriate, alcohols containing a larger number of alcoholic OH groups, such as tri-methylolpropane, glycerol, pentaerythritol, trimethylol-benzene or trishydroxyethyl isocyanurate.

Examples of suitable epoxy resins are glycidyl ethers, as prepared from 2,2-bis(4-hydroxyphenyl)-propane and epichlorohydrin. These epoxy resins may be further modified, for example by reaction with polyfunctional alcohols or SH compounds. Examples of such polyfunctional alcohols which are suitable for effecting modification are ethylene glycol, propylene 1,2-glycol, propylene 1,3-glycol and butane-1,4-diol.

If elastification is desired, it is also possible to use long-chain polyfunctional alcohols or mercaptans. Where the polyfunctional alcohols or mercaptans are used in amounts greater than equivalent amounts in respect of the epoxide groups present, the products formed possess terminal OH or SH groups. If, on the other hand, the amounts used are less than the equivalent amounts, the resulting products possess terminal epoxide groups and can, if desired, be reacted further. While the reaction of the mercaptans with epoxide groups takes place even in the absence of a catalyst, the reaction of the alcohols requires the use of a catalyst, eg. dimethylbenzylamine, and elevated temperatures of about 50–150° C.

The urea condensates according to the invention can be combined with conventional self-crosslinking binders in amounts such that these binder combinations contain from 2 to 50, preferably from 10 to 40, % by weight of the urea condensates according to the invention and from 50 to 95, preferably from 60 to 90, % by weight of the other self-crosslinking binders.

In the case of combinations with non-croslinking binders, the proportions are from 10 to 60, preferably from 20 to 40, % by weight of urea condensate and from 40 to 90, preferably from 60 to 80, % by weight of noncrosslinking binder.

The binders according to the invention if necessary together with additives such as pigments, assitants and curing catalysts, can be applied onto substances such as wood, plastic or metal by conventional methods, such as spraying, dipping, painting, pouring and knife-coating.

For the preparation of powder formulations, solid, solvent-free combinations of the urea condensates according to the invention with other binders, whose softening points should in each case be >60° C. for reasons of blocking resistance, are dry-milled, and the product is mixed with conventional additives, such as pigments, fillers and leveling agents, for example those based on polyacrylates. The mixtures are then homogenized in the melt at about 100° C. (eg. in an extruder).

When the extrudates have been cooled to room temperature, they are milled thoroughly. Coarse fractions (above 70 μm) are separated off by screening. The powder formulations are usually applied by electrostatic powder spraying.

The products according to the invention are particularly advantageous for use in binder systems which contain basic groups, especially in those which are water-dilutable as the result of protonation with acids, in particular in binder systems for the cathodic electrocoating of electrically conductive substrates, such as metal articles, sheets, etc., made of brass, copper or aluminum, metalized plastics, materials coated with conductive carbon, and iron and steel which may or may not have been chemically pretreated, eg. phosphatized. For this purpose, an acid, eg. formic acid, acetic acid, phosphoric acid or lactic acid, is added in order to effect partial or complete neutralization. The urea condensates according to the invention are also suitable as binder components for the EPC (electropowder coating) method.

Examples of such binders containing basic groups are reaction products of epoxy reins with primary or secondary amines. A particularly suitable reaction in this context is the reaction with hydroxyl-containing amines, eg. ethanolamine, methylethanolamine and diethanolamine.

If the products used contain sufficient amounts of amino groups to become water-soluble or water-dispersible after protonation with acids, it is possible, in combination with the urea condensates according to the invention, to prepare water-dispersible binders for baking finishes, in particular binders which can be used for cathodic electrocoating. The abovementioned reaction products of epoxy resins with primary or secondary amines can be used for this purpose.

Many of the base resins proposed for cathodic electrocoating can also be used in combination with the urea condensates according to the invention, for example the reaction products of phenolic Mannich bases with epoxy resins according to German Patent. No. 2,419,179, the reaction products of extended-chain epoxy resins with secondary amines according to U.S. Patent No. 4,104,140, reaction products (meth)acrylamidomethylated phenols, amines and epoxy resins, for example as described in German Laid-Open Applications DOS No. 2,942,488 and DOS No. 3,021,300.

It is often advantageous to use products which contain primary and/or secondary amino groups, since these permit the preparation of aqueous electrocoating baths having a high pH of, for example, from 6.5 to 8.0. A high pH value, especially one in the region of pH 7 or higher makes it possible to avoid corrosion of plants. A possible method of obtaining suitable products containing primary and secondary amino groups is to react excess primary diamines with epoxy resins and then eparate off the excess amine at elevated temperatures and under reduced pressure.

Particularly suitable diamines for this purpose are those of 2 to 6 carbon atoms, eg. etylenediamine, 1,2- and 1,3-diaminopropane, 1,4-diaminobutane and hexamethylenediamine. The reaction products can, if desired, be subjected to chain-lengthening reactions with dicarboxylic acids, for example with sebacic acid or with a dimeric fatty acid. The desired molecular weight can be set by the ratio of dicarboxylic acid to epoxy resin/amine adduct; for example, 1 mole of dimeric fatty acid can be employed per two molecules of epoxy resin/amine adduct.

Another possible method for preparing suitable products containing primary amino groups is the reaction of epoxy resin with secondary amines which contain blocked primary amino groups. Examples of such amines are the diketimine of diethylenetriamine, the ketimine of aminoethylethanolamine and the ketimine of N-methylethylenediamine. The ketimines can be prepared in a simple manner from the free amines and a ketone, eg. methyl isobutyl ketone, with removal of water. In the reaction with epoxy resins, only the secondary amino group reacts; the ketimine can then be cleaved by adding water, the free primary amino group being formed again. By reacting some of the primary amino groups with dicarboxylic acids, these products too can be elastified by chain-lengthening.

The amounts in which the urea condensates according to the invention can be used as surface coating binder components are about 2–50, preferably 10–40, % by weight, based on the total binder, provided that they are used in combination with another self-crosslinking surface coating binder; where they serve as the sole crosslinking agent in combination with a non-selfcrosslinking surface coating binder, the amounts to be used are about 10–60, preferably 20–40, % by weight based on the total binder.

The Examples which follow illustrate the invention without restricting it. Parts and percentages are by weight, unless stated otherwise.

EXAMPLE 1

67 parts of trimethylolpropane, 550.8 parts of urea and 2322 parts of di-n-butylamine are initially taken. An internal pressure of 4 bar is established at room temperature with nitrogen, and the mixture is then heated to 140oC while stirring. During this procedure, the internal pressure is controlled so that a constant pressure of 4 bar is alway maintained. After about 0.5 hour at 140oC, the internal temperature is increased to 160oC While maintaining a pressure of 4 bar, 522 parts of hexamethylenediamine are added in the course of about 1 hour. Thereafter, the temperature is increased stepwise to 210oC, and stirring is continued for about a further 7 hours under a pressure of 4 bar at this temperature. The pressure is then let down, the temperature is decreased to about 175oC, and excess di-n-butylamine is distilled off under reduced pressure. 149.2 parts of triethanolamine are then added at about 160oC, and further di-n-butylamine is distilled off under raduced pressure until an amine number of'about 5 is reached. The mixture is cooled to 120oC and then diluted with methyl isobutyl ketone until a yellowish, resin-like liquid having a solids content of 80% is formed.

EXAMPLE 2

Similarly to Example 1, 134 parts of trimethylolpropane, 112.7 parts of triethylene glycol, 550.8 parts of urea and 2322 parts of di-n-butylamine are initially taken. An internal pressure of 4 bar is established at room temperature with nitrogen, and the mixture is heated to 140oC while stirring. During this procedure, the internal pressure is controlled so that a constant pressure of 4 bar is always maintained. After about 0.5 hour at 140oC, the temperature is increased to 160°–170° C., and 522 parts of hexamethylenediamine are added in the course of about 1 hour while maintaining the pressure of 4 bar. Thereafter, the temperature is increased to 200oC, and the reaction mixture is stirred for 8 hours at this temperature. The pressure is then let down, the temperature is decreased to 175oC, and excess di-n-butylamine is distilled off under reduced pressure. After further cooling to about 100oC, the solids content is brought to about 80% with methyl isobutyl ketone.

COMPARATIVE EXAMPLE 1

522 parts of hexamethylenediamine, 201 parts of trimethylolpropane, 550.8 parts of urea and 2322 parts of di-n-butylamine are heated to 160oC in the course of 2 hours. During this procedure, ammonia is eliminated above about 130oC The reaction mixture is initially liquid, and would solidify to a white crystalline mass if the temperature were not increased to about 180oC. At 80oC, a clear melt i again obtained, the excess di-nbutylamine used acting as solvent and reactant. After a reaction time of about 8 hours, during which the temperature is increased further to 215oC, the mixture is cooled to 190oC and excess di-n-butylamine is stripped off under reduced pressure. The mixture is cooled to 130oC and then diluted with methyl isobutyl ketone until a colorless, viscous liquid having a solids content of 80% is formed.

COMPARATIVE EXAMPLE 2

67 parts of trimethylolpropane, 550.8 parts of urea and 2322 parts of di-n-butylamine are initially taken. An internal pressure of 4 bar is established with nitrogen, and the temperature is increased to 140oC while stirring. The internal pressure of 4 bar is kept constant. After about 0.5 hour, the internal temperature is increased to 165oC, and 522 parts of hexamethylenediamine are forced into the kettle with nitrogen in the course of 1 hour. When the addition is complete, the mixture is heated to 210oC, and the internal pressure is still maintained at 4 bar. After a total reaction time of 8 hours, the mixture is cooled to about 190oC, the pressure is let down and excess di-n-butylamine is distilled off. Thereafter, the mixture is cooled to 100oC and diluted with methyl isobutyl ketone so that a colorless to slightly yellowish liquid having a solids content of 80% is formed.

Use E xamples

Firt, a non-self-crosslinking cathodic binder is prepared. To do this, 200 parts of the epoxide/amine adduct prepared by reacting a commercial epoxy resin based on 2,2-bis-(4-hydroxy'heny:1)-propane with one epoxide equivalent weight of 500 and a 5-fold molar excess of hexamethylenediamine, which is distilled off under reduced pressure when the reaction is complete, 30 parts of a dimerized fatty acid and 20 parts of xylene are gradually heated to 190oC with removal of water, and are kept at this temperature for one hour. The mixture is cooled to 130oC, after which it is diluted with 9 parts of butylglycol, followed by 70 parts of isobutanol. The product has a solids content of 70%.

42.8 parts of the urea condensates from Examples 1 and 2 and from Comparative Examples 1 and 2 are added to 100 parts of this solution, and the mixture obtained in each case is mixed with 2.4 parts of acetic acid.

To test the products as cathodic electrocoating finishes, 10% strength dispersions are prepared by adding fully demineralized water to the binders, to which an acid has been added. 66 parts of.pigment paste prepared as described below are added in each case to 1000 parts of the particular binder dispersion, while stirring.

Pigment paste

A paste binder is prepared as described in Example 1a) of German Laid-Open Application DOS No. 3,121,765. To do this, 200 parts of ethylene glycol monobutyl ether are heated to 90oC in a reaction vessel. A mixture of 396 parts of N-vinylpyrrolidone, 204 parts of vinyl propionate and 1.2 parts of azobisisobutyronitrile is then added dropwise in the course of 2 hours. Finally, polymerization is continued for 1 hour at 90oC. The resulting solution polymer ha a Fikentscher K value of 24. The solids content of the copolymer solution is 76%.

250 part of this copolymer solution, 210 parts of ethylene glycol monobutyl ether, 555 parts of ethylene glycol monoethyl ether, 837 parts of fully demineralized water, 1084 parts of kaolin, 217 parts of basic lead silicate, 145 parts of carbon black, 36 parts of rutile and 3000 parts of glas beads having a diameter of 2 mm are stirred for 45 minutes at a speed of 1000 rpm in a stirred ball mill. After the glass beads have been separated off, a black pate having a olids content of 50.6% is obtained.

The electrocoating baths prepared in this manner are stirred for 48 hours at 30oC Surface coating films are deposited in the course of 2 minute, at the voltage shown in the Table, on zinc-phosphatized steel test panels which have been made the cathode, and the surface coating films are baked for 20 minutes at 180oC, at 160oC and at 140oC. Thereafter, the resistance to acetone is tested by rubbing forward and back 50 times with an ace- tone-impregnated cottonwool ball, and the flexibility is tested in the form of the reverse impact. The Table below shows the results:

atoms or a hydroxyalkyl radical obtained by an addition reaction of an epoxide compound with a secondary amine, or
(E) a mixture of (D) and one or more polyalcohols which differ from (D) and contain two or more primary or secondary hydroxyl groups,
at elevated temperatures and in the presence or absence of a catalyst, and the ammonia forsed is separated off.

2. A process as claimed in claim 1, wherein the ratio of the number of equivalents of NH2 groups of the primary amine (A) to the number of equivalents of NH2 groups of the urea (B) to the number of equivalents of NH groups of the secondary monoamine (C) to the number of OH groups of the polyalcohols (D) and (E) is 1:1.2-2.4: 0.2-20:0.1-0.9:0-0.5.

3. A process as claimed in claim 1, wherein (A) is an aliphatic primary amine whose primary amino groups are separated from one another by more thau 3 carbon atoms, or a cycloaliphatic or aromatic polyamine whose primary amino groups are separated from one another by 3 or more carbon atoms.

4. A process as claimed in claim 1, wherein a polyalcohol having a molecular weight of from 106 to 5000 and containing from 2 to 10 hydroxyl groups is used as component (D).

5. A process as claimed in claim 1, wherein an excess of a secondary monoamine is employed, and is distilled off under reduced pressure at the end of the reaction.

6. A process as claimed in claim 1, wherein the total amount of the primary amines (A) is reacted with the components (B), (C), (D) and, where relevant, (E).

7. A process as claimed in claim 1, wherein some or all of component (A) is added, in the course of the reaction, to the reaction mixture consisting of components (B), (C), (D) and, where relevant, (E).

|  | pH | Deposition voltage | Bath temperature | Film thickness | Results of the binder test | | | |
|---|---|---|---|---|---|---|---|---|
|  |  |  |  |  | Throwing power according to Ford | Acetone resistance a baking temperature | Reverse impact in × lb | ASTM salt spray test, underpenetration at the scratch |
| Example 1 | 8.0 | 300 V | 27° C. | 32 μm | 22 cm | 1 (160° C.) | 160 | 500 h 0.2 |
|  |  |  |  |  |  | 2 (140° C.) | 100 | 500 h 0.4 |
| Example 2 | 7.9 | 300 V | 27° C. | 29 μm | 21.0 cm | 1 (160° C.) | 140 | 500 h 0.3 |
|  |  |  |  |  |  | 2 (140° C.) | 100 | 500 h 0.5 |
| Comparative example 1 | 7.9 | 300 V | 27° C. | 17 μm | 20 cm | 1 (160° C.) | 140 | 500 h 0.2 |
|  |  |  |  |  |  | 2 (140° C.) | 80 | 500 h 0.3 |
| Comparative example 2 | 8.1 | 300 V | 27° C. | 19 μm | 21.5 cm | 1 (160° C.) | 160 | 500 h 0.3 |
|  |  |  |  |  |  | 3 (140° C.) | 20 | 500 h 0.7 |

We claim:

1. A process for the preparation of a urea condensate, wherein
(A) one or more primary amines selected from the group consisting of diamines and polyamines are reacted with
(B) urea,
(C) one or more secondary monoamines and
(D) one or more polyalcohols which contain two or more primary or secondary hydroxyl groups and in addition one or more of the groups ether oxygen

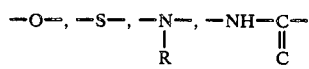

wherein R is alkyl ot ! to 12 carbon atoms, cycloalkyl, unsubstituted or substituted phenyl of 6 to ZO carbon atoms, hydroxyalkyl or 2 to 12 carbon 8. A process as claimed in claim 1, wherein some or all of component (A) is added in the course of the reaction to the reaction mixture consisting of components (B), (C) and (E), and component (D) is only added when the addition of (A) is complete.

9. A process as claimed in claim 1, wherein the reaction is carried out under a pressure of from 0.1 to 20 bar.

10. A process as claimed in claim 1 wherein the reaction is carried out at a temperature of from 120 to 230° C.

11. A proces as claimed in claim 1 wherein a secondary amine having a boiling point of from 100 to 200° C. is used as component (C).

12. A process as claimed in claim 1, wherein di-nbutylamine is used as the secondary amine.

13. A urea condensate obtainable by a process as claimed in claim 1.

14. A process for the preparation of a heat-curable surface coating, with a urea condensate prepared by a process as claimed in claim 1 as binder component.

15. A process for the preparation of a heat-curable cathodic electrocoating finish, wherein a urea condensate prepared by a process as claimed in claim 1 is used as the binder component.

16. A process for the preparation of a powder formulation, wherein a urea condensate prepared by a process as claimed in claim 1 is used as the binder component for powder coating.

17. A binder for heat-curable surface coatings, which consists of from 50 to 98 % by weight of a conventional self-crosslinking surface coating binder and from 2 to 50% by weight of a urea condensate prepared by a process as claimed in claim 1.

18. A binder for heat-curable surface coatings, which consists of from 40 to 90% by weight of conventional non- self-crosslinking surface coating binder and from 10 to 60% by weight of urea condensate prepared by a process as claimed in claim 1.

* * * * *

UNITED STATES PATENT AND TRADEMARK OFFICE
CERTIFICATE OF CORRECTION

PATENT NO. : 4,713,440

DATED : December 15, 1987

INVENTOR(S) : Rolf OSTERLOH et al

It is certified that error appears in the above-identified patent and that said Letters Patent is hereby corrected as shown below:

Column 11, line 66

[ot:] should be:

of 1

Column 11, line 67
[z0] should be:

20

Column 12, line 8
[forsed] should be:

formed

Column 12, line 18
[thau] should be:

than

Signed and Sealed this

Ninth Day of August, 1988

Attest:

DONALD J. QUIGG

Attesting Officer      Commissioner of Patents and Trademarks